R. F. BERKEBILE.
VACUUM OPERATED BRAKE MECHANISM.
APPLICATION FILED NOV. 2, 1916.
1,216,542.
Patented Feb. 20, 1917.
2 SHEETS—SHEET 2.
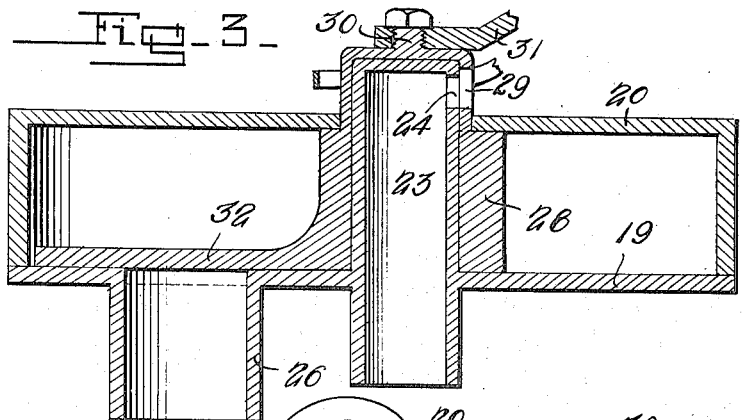
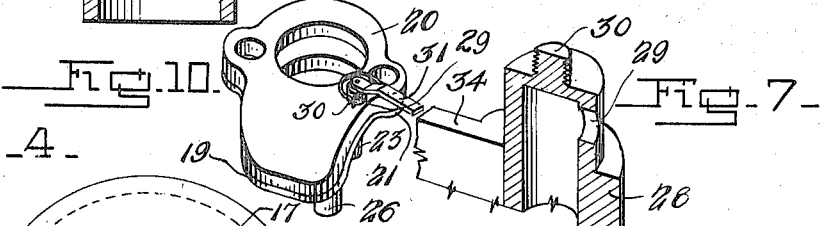
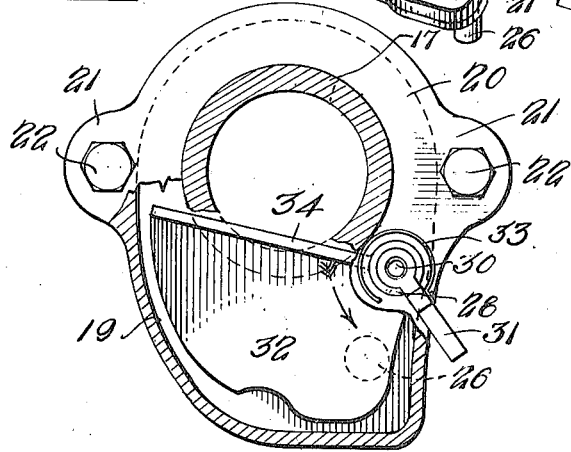
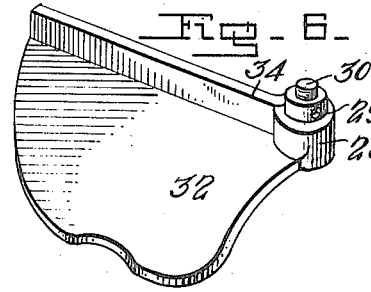
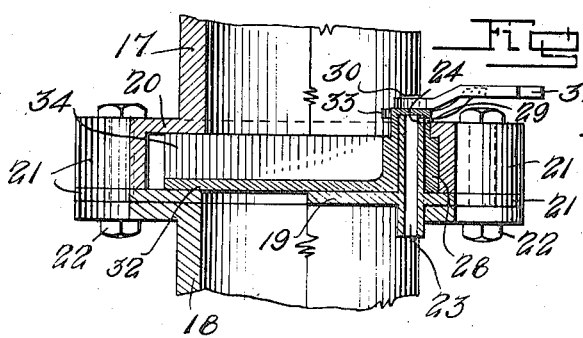
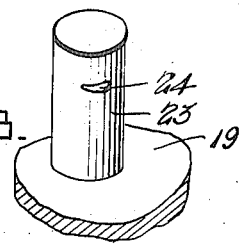
Inventor
Robert F. Berkebile
By Lancaster & Alwine
his Attorneys

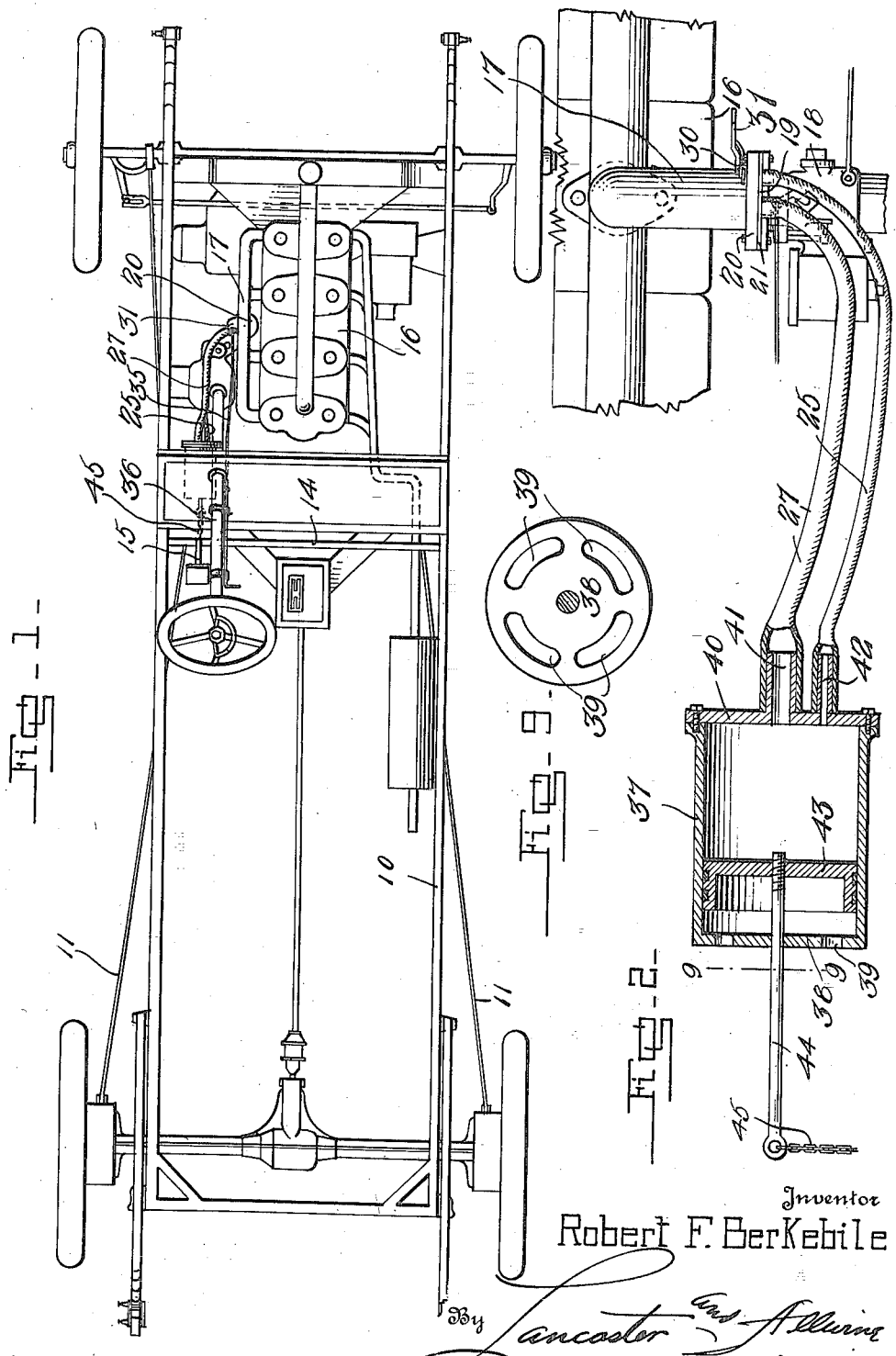

UNITED STATES PATENT OFFICE.

ROBERT F. BERKEBILE, OF KANTNER, PENNSYLVANIA.

VACUUM-OPERATED BRAKE MECHANISM.

1,216,542.  Specification of Letters Patent.  Patented Feb. 20, 1917.

Application filed November 2, 1916. Serial No. 129,189.

*To all whom it may concern:*

Be it known that I, ROBERT F. BERKEBILE, a citizen of the United States, and a resident of Kantner, in the county of Somerset and State of Pennsylvania, have invented a certain new and useful Improvement in Vacuum-Operated Brake Mechanism, of which the following is a specification.

My present invention relates to an improved brake operating mechanism adapted to be applied to machinery, vehicles, and the like, which are propelled by internal combustion engines, and which may be actuated and controlled thereby.

The object in view is the provision of brake operating mechanism, of simple and inexpensive construction, that is efficient in operation, quick in action and of easy control, and wherein the suction generated by the propelling internal combustion engine may be utilized for actuating the brake operating mechanism.

A further object is the provision of brake operating mechanism which is controlled by the opening and closing of a valve, thus applying braking energy in varying degrees so as to check the motion of the machinery, vehicle, or the like, in part, entirely, or in any degree the operator may desire.

A still further object is the provision of brake operating mechanism of this character, the control valve which may be connected to the intake side of an internal combustion engine in any suitable manner, or which may be connected in any suitable manner to the intake manifold of an internal combustion engine, between the engine and the carbureter, or beyond the carbureter, or to any device actuated by an internal combustion engine for the purpose of creating a suction.

The above, and other objects and advantages of my invention will be brought out more fully in the following detailed description of the preferred embodiment of my invention, the same being illustrated in the accompanying drawings as being attached to a vehicle propelled by an internal combustion engine, wherein:

Figure 1 is a top plan view of the chassis of a motor vehicle having an internal combustion engine mounted thereon and showing my brake operating mechanism applied to the vehicle brake and to the engine in accordance with my present invention.

Fig. 2 is a detail side elevation, partly in section, showing my brake operating mechanism as applied to the intake manifold of the engine.

Fig. 3 is an enlarged sectional view taken vertically through the improved valve for controlling the brake operating mechanism.

Fig. 4 is a transverse sectional view taken through the manifold of an internal combustion engine, and showing the improved valve applied thereto, the latter being shown partly in section.

Fig. 5 is a transverse section taken through the valve as applied to the manifold, the section being taken at right angles to the showing in Fig. 3.

Fig. 6 is a detail perspective view, enlarged, showing the valve head removed.

Fig. 7 is a fragmentary further enlarged sectional view of the pivotally supported end of the valve head.

Fig. 8 is a detail perspective view of the riser carried in the bottom of the valve casing, and upon which the valve of Fig. 6 is mounted to turn.

Fig. 9 is a transverse section on the line 9—9 of Fig. 2 looking in the direction of the arrow, and showing the outer end or head of the brake-operating cylinder.

Fig. 10 is a detail, perspective view of a slightly modified form of controlling valve the same being adapted for securement between the manifold and the carbureter of an internal combustion engine.

Referring to these drawings, wherein like numerals refer to similar parts throughout the several views, 10 designates the chassis of an automobile provided in the usual manner with brake rods 11 connected at their forward ends to a rocker shaft 14, to which a pedal 15 or the like operating device may be connected.

The chassis 10 is also provided with an internal combustion engine 16 of any approved type, which has the usual intake manifold 17 at one side thereof connected to a suitable carbureter 18.

My brake operating mechanism is provided with an improved valve, the same being disclosed in the present instance as comprising a bottom plate 19 adapted to be fitted upon the outlet side of the carbureter 18, the plate 19 extending laterally about the carbureter. A casing 20, formed of a top plate and depending side flanges, is seated upon the bottom plate 19 and has the flanges thereof resting on said bottom plate at the marginal edge of the same. Registering apertured lugs 21 project from the opposite sides of the bottom plate and the casing, and are adapted to register with the laterally extending lugs of the carbureter 18. Bolts 22 or the like pass through these registering lugs to bind the valve casing on the outlet side of the carbureter. This casing 20, as shown in Figs. 4 and 5, preferably comprises the lower end of the manifold 17, and serves as the connection between the carbureter and the manifold. The bottom 19 is provided, at one side of the manifold 17, with a riser 23 which extends upwardly through the top of the casing 20 and is provided thereabove with a lateral air vent 24. As shown in Fig. 8, this vent 24 extends peripherally around riser 23 for a short distance, and is gradually reduced in size from one end to the other. The riser 23 opens through the bottom plate 19 and is adapted for attachment to one end of an air pipe 25. The bottom plate 19 is also provided, at one side of the riser 23, with a depending attaching nipple 26 which opens upwardly through the bottom plate. An exhaust pipe 27 has one end connected to the nipple 26. The valve casing is provided with a valve, shown in detail in Fig. 6, comprising a hub portion 28 mounted to turn on the riser 23 and having an upwardly extending cap portion preferably formed integrally therewith and provided in one side with an air opening 29. The cap of the valve extends upwardly through the casing and is provided with a threaded stem 30 upon which is detachably mounted an operating arm 31. The hub 28 is provided at one side with a leaf or web 32 adapted to traverse the upper side of the bottom plate 19 and to normally close the opening 26. The leaf 32 is held normally retracted out of the manifold 17 by a spring 33 which may have one end connected to the arm 31, and its opposite end connected to the casing 20. The outer edge of the leaf 32 is provided with an upstanding flange 34 adapted to seat in one side of the manifold 17 when the leaf is retracted. The flange 34 closes communication between the manifold 17 and the laterally extending portion of the valve casing.

As shown in Fig. 1, the operating arm 31 may be pivotally connected to a rod 35 which extends rearwardly from the manifold 17, and which is secured to and carried upwardly upon the steering post 36. The rod 35 may have any suitable formation at its upper end by means of which the rod may be turned to swing the arm 31 and thus open and close the brake-controlling valve.

Referring particularly to Fig. 2, there is provided a cylinder 37 having one head 38 thereof provided with openings 39 therethrough admitting atmospheric air to said end of the cylinder. This head 38 may be integrally formed with the cylinder 37 as shown in the drawings, or may be made and applied thereto in any other suitable manner. The opposite head 40 of the cylinder is preferably detachably secured thereon, and is provided with a relatively large outwardly extending nipple 41 to which the free end of the suction pipe 27 may be connected. The head 40 is also provided with a relatively small attaching nipple 42 to which the free end of the air inlet pipe 25 may be attached. A piston 43 is mounted in the cylinder 37 and is adapted to move longitudinally therein. The piston 43 is provided with a piston rod 44 which projects through the head 38 and is provided upon its outer end with an eye to which is connected one end of a chain 45 having its opposite end connected to the rocker shaft 14. It is of course understood that the connection between the rod 44 and the arm 15 is such as to permit the free straight-line movement of the rod, and the independent operation of the vehicle brakes.

The valve mechanism is held in normal "brakes off" position by tension of spring 33, and in this position flange 34 registers in its proper position in the wall of manifold 17 and leaf 32 covers opening 26 thereby shutting off any communication to cylinder 37, likewise air port 29 registers with the greatest opening of air port 24, opening an unobstructed passage through pipe 25 to the cylinder 37 which equalizes the atmospheric pressure on both sides of piston 43, which then is held against the open end of the cylinder 37 by the usual brake springs, or provision may be made for so holding by a cylinder spring, not shown.

In operation, whether engine 16 is running under its own power or because of the momentum of the machinery or vehicle to which it is attached, to apply the brake it is only necessary to move rod 35 against tension of spring 33 and thus swing arm 31. The movement of arm 31 causes the hub 28 to move around the riser 23 and thus, in proportion to the movement, to shut off the inflow of air through air ports 29 and 24 through the pipe 25 to cylinder 37. At the same time a corresponding movement is communicated to the leaf 32 causing the flange 34 to leave its recess in the wall manifold, and the leaf 32 to correspondingly uncover the opening 26, thus opening a passage for suction from the engine 16 through the pipe 27 to the cylinder 37. As leaf 32 moves inwardly across the manifold 17 it shuts off part of the suction passing therethrough and diverts the same through valve opening 26 and pipe 27 which causes the exhaustion, in whole or part, of the air in cylinder 37. The vacuum so created in cylinder 37 between end 40 thereof and piston 43, permits the atmospheric air pressure entering openings 39 in the other end of cylinder to move piston 43 which movement being communicated to the brake rods 11 applies the brake. This atmospheric pressure upon piston 43, and which is transmitted to the brake, is far greater than possible to be obtained by manual operation on levers or the like. For with a cylinder of but eight inches in diameter it is possible to secure a brake pressure of between ten and twenty times greater than that exerted by even the strongest man on the manually operated levers now provided, and as the admission of air is controlled by the movement of arm 31 and the size and shape of the air port 24, and the same movement likewise regulates the amount of suction which may be communicated to cylinder 37, and as the whole is controlled through the rod 35 which may be conveniently secured within easy reaching distance on the steering column, dash-board or any other part of a vehicle or mechanism it is obvious that any driver of a vehicle equipped with this brake-operating mechanism can quickly apply the brakes at any desired pressure, from the minimum to the maximum, by simply manipulating the rod 35, and as the average engine running at even the average slow speed will empty a cylinder of the required size within a fraction of a second, the minimum to the maximum brake pressure may be applied as quickly, if not quicker, than with the manually operated brakes.

Any other suitable leverage system than as shown in Fig. 1, may be employed for increasing or decreasing the effective pull on the brake rods 11. The vacuum passage through pipe 27 and the parts connected thereto, should be considerably larger than the air passage through pipe 25 and the parts connected thereto, so as to obtain quickly the complete exhaustion of the closed end of the cylinder 37 when the valve is opened to its fullest extent in emergency cases, and to provide for the more complete control of the brakes.

It is understood that various changes and modifications may be made in the structure and arrangement of the above-specifically described parts of the present embodiment of my invention without departing from the spirit of the same, such changes and modifications being restricted only by the scope of the appended claims.

Having thus fully described my invention, what I claim as new and desire to secure by Letters Patent is:

1. In a brake mechanism, the combination with the intake manifold and the carbureter of an internal combustion engine, of a brake cylinder, a valve casing communicating at one side with the cylinder and adapted to be interposed between the manifold and the carbureter for connecting the same together, said casing having an air vent in said side, and a valve arranged in said side of the casing normally out of line with the charge passage therein and adapted to control the exhaust of air from the cylinder and the admission of air thereto through said vent.

2. In a vacuum-controlled brake mechanism, a cylinder open to the atmosphere at one end and closed at its opposite end, a valve casing having an exhaust port therein adapted to be connected to a suction-creating device, and having an air-receiving passage therein open to the atmosphere, separate pipes connecting the exhaust port and the air inlet passage to the closed end of said cylinder, and controlling means mounted in said casing adapted to alternately open and close the exhaust port and the air inlet passage to vary the degree of suction in said closed end of the cylinder.

3. In a brake mechanism including a cylinder, the combination with an intake manifold of an explosive engine, of a valve casing formed upon the lower end of the manifold, a bottom plate adapted for engagement over the outlet side of a carbureter and adapted to fit against said valve casing, a cylinder exhaust connection in one side of said valve casing, a valve in said casing between the cylinder exhaust connection and the manifold for controlling the suction in the manifold from said cylinder connection, and means for regulating said valve for varying the degree of suction in said cylinder connection.

4. In a brake mechanism, the combination of an intake manifold of an internal combustion engine, a valve casing adapted to be fitted to said manifold, said valve casing having exhaust and air inlet ports, and a single valve in said casing arranged to control communication between the casing and the manifold, and between said air inlet port and the atmosphere, said valve being adapted to simultaneously control the suction and the admission of air through said casing.

5. In a brake mechanism, the combination with the manifold and a carbureter of an internal combustion engine, of a valve casing adapted to be fitted to said manifold and forming a connection between the same and the carbureter and communicating at one side therewith, said casing being provided in its opposite side with an exhaust port, a valve pivoted in said opposite side of said casing adapted to normally cover said port and provided with a closure part seated in one side of the casing and adapted to move into the same when said port is uncovered to communicate the exhaust port with the manifold, said casing having an air inlet passage, and means carried by said valve for controlling the passage of air through the casing.

6. In a brake mechanism, the combination of a casing adapted for communication with the manifold of an internal combustion engine, a riser mounted in one side of the casing, a valve having a hub portion pivotally mounted on said riser and provided with a leaf adapted to traverse the bottom of the valve casing, said hub portion having an air inlet opening in one side thereof, and said riser being hollow and having an opening at one side adapted to register with the opening in said hub portion, said casing being provided with an opening in the bottom thereof adapted to be closed by said leaf portion, and means for turning the valve to cover the opening in the bottom of said valve casing, and to open the passages through said riser and said hub portion of the valve.

7. In a brake operating mechanism, the combination of a valve casing adapted for communication with the intake side of an internal combustion engine, exhaust and air admission valve mechanism movably mounted therein and thereout, means for supporting said valve mechanism in normal open position and means for operating said valve mechanism to open and close the exhaust passage therein and to simultaneously, partly or wholly, close or open the air admission port or ports therein and thereout, so to apply, in part or entirely, or to release in part or entirely, brake-operating mechanism actuated by the pressure of the atmosphere, whether induced by the suction of said internal combustion engine, or a suction device operated by said engine.

ROBERT F. BERKEBILE.